United States Patent [19]

Davidson

[11] Patent Number: 5,161,823
[45] Date of Patent: Nov. 10, 1992

[54] VEHICULAR SHOCK ABSORBER APPARATUS

[76] Inventor: John S. Davidson, 51 Park Woods Village Drive #602, N. York, Ontario, Canada, M3A-2Y1

[21] Appl. No.: 745,199

[22] Filed: Aug. 15, 1991

[51] Int. Cl.$^5$ ............................................. B62D 9/02
[52] U.S. Cl. ................................... 280/772; 280/6.12; 280/707
[58] Field of Search .............. 280/772, 840, 6.12, 280/707, DIG. 1; 180/141

[56] References Cited

U.S. PATENT DOCUMENTS

| | | | |
|---|---|---|---|
| 2,165,617 | 7/1939 | Paes et al. | 280/772 |
| 3,820,809 | 6/1974 | Blonar | 280/772 |
| 4,345,661 | 8/1982 | Nishikawa | 280/772 |

*Primary Examiner*—Kenneth R. Rice
*Attorney, Agent, or Firm*—Leon Gilden

[57] ABSTRACT

A vehicle includes at least one control unit mounted to each side of an associated vehicle, wherein the control unit is sensitive to tilting of the vehicular body relative to the suspension components. The control unit includes a lower cylindrical portion telescopingly received within an upper cylindrical portion to effect dampening, with the upper cylindrical portion including an alignment unit, wherein the alignment unit is arranged for selective reciprocation relative to the upper cylindrical portion to effect alignment of the body portion in response to hydraulic fluid line pressure and positioning of the body and suspension components of the vehicle.

5 Claims, 3 Drawing Sheets

VEHICULAR SHOCK ABSORBER APPARATUS

BACKGROUND OF THE INVENTION

1. Field of the Invention

The field of invention relates to shock absorber apparatus, and more particularly pertains to a new and improved vehicular stabilizing shock absorber apparatus wherein the same is arranged to maintain alignment of a vehicle in a neutral orientation relative to a road surface during use.

2. Description of the Prior Art

Shock absorber apparatus of various types are utilized in the prior art to effect dampening and control responsive to varying road conditions.

Such apparatus is exemplified in U.S. Pat. No. 4,874,066 to Silberstein wherein a shock absorber utilizes a variable flow within the dampening unit of the shock absorber to effect response to varying road conditions.

U.S. Pat. No. 4,832,162 to Bacarti sets forth a further example of a variable rate shock absorber utilizing a solenoid valve positioned within a hollow piston to permit rate of flow through the piston dampening unit.

U.S. Pat. No. 4,850,460 to Knecht, et al. sets forth a hydraulic shock absorber wherein dampening is operative through an electrical magnetically activated valve body to accommodate and direct flow passage.

U.S. Pat. No. 4,805,882 to Veaux, et al. sets forth a shock absorber formed with two variable volume chambers therewithin.

As such, it may be appreciated that there continues to be a need for a new and improved vehicular stabilizing shock absorber apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of shock absorber apparatus now present in the prior art, the present invention provides a vehicular stabilizing shock absorber apparatus wherein the same effects stabilizing of the vehicular body relative to an underlying road surface condition. As such, the general purpose of the present invention, which will be described subsequently in greater detail, is to provide a new and improved vehicular stabilizing shock absorber apparatus which has all the advantages of the prior art shock absorber apparatus and none of the disadvantages.

To attain this, the present invention provides a vehicle including at least one control unit mounted to each side of an associated vehicle, wherein the control unit is sensitive to tilting of the vehicular body relative to the suspension components. The control unit includes a lower cylindrical portion telescopingly received within an upper cylindrical portion to effect dampening, with the upper cylindrical portion including an alignment unit, wherein the alignment unit is arranged for selective reciprocation relative to the upper cylindrical portion to effect alignment of the body portion in response to hydraulic fluid line pressure and positioning of the body and suspension components of the vehicle.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicular stabilizing shock absorber apparatus which has all the advantages of the prior art shock absorber apparatus and none of the disadvantages.

It is another object of the present invention to provide a new and improved vehicular stabilizing shock absorber apparatus which may be easily and efficiently manufactured and marketed.

It is a further object of the present invention to provide a new and improved vehicular stabilizing shock absorber apparatus which is of a durable and reliable construction.

An even further object of the present invention is to provide a new and improved vehicular stabilizing shock absorber apparatus which is susceptible of a low cost of manufacture with regard to both materials and labor, and which accordingly is then susceptible of low prices of sale to the consuming public, thereby making such vehicular stabilizing shock absorber apparatus economically available to the buying public.

Still yet another object of the present invention is to provide a new and improved vehicular stabilizing shock absorber apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
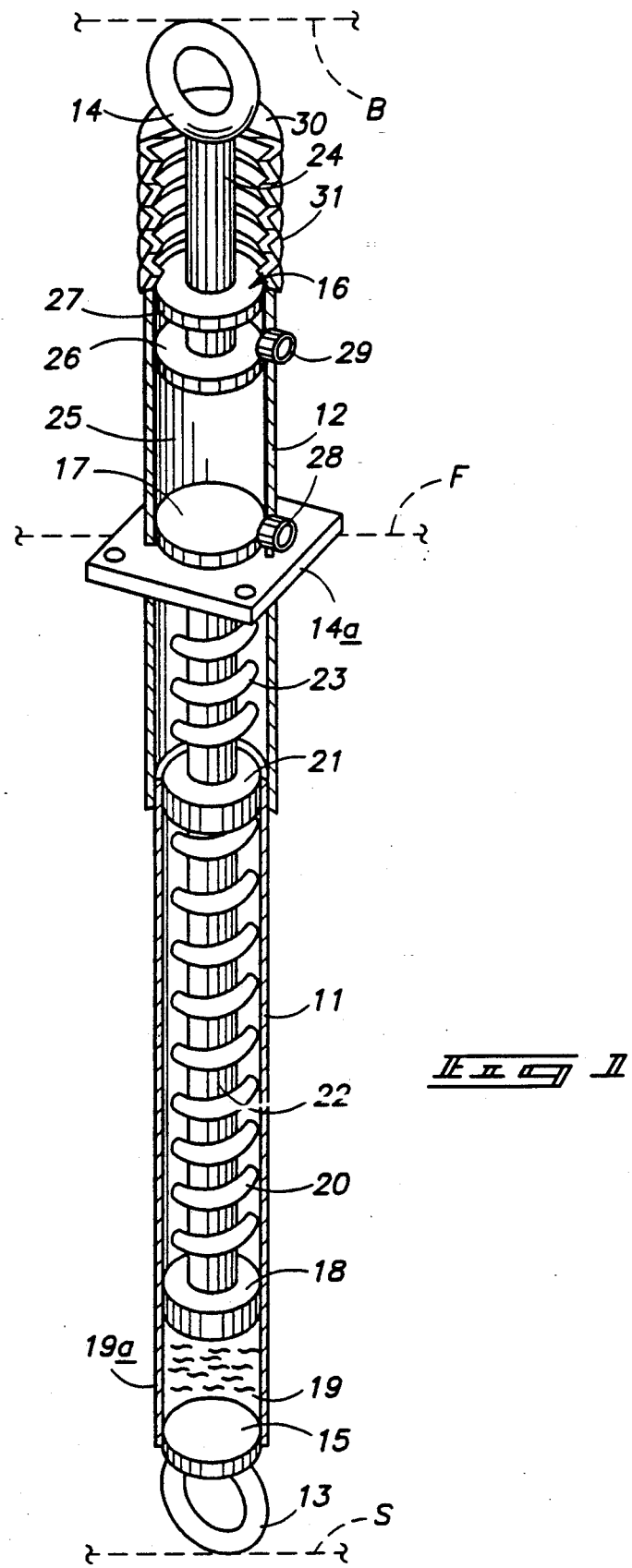
FIG. 1 is an isometric illustration, partially in section, of a control unit utilized by the invention.
Figure 2:
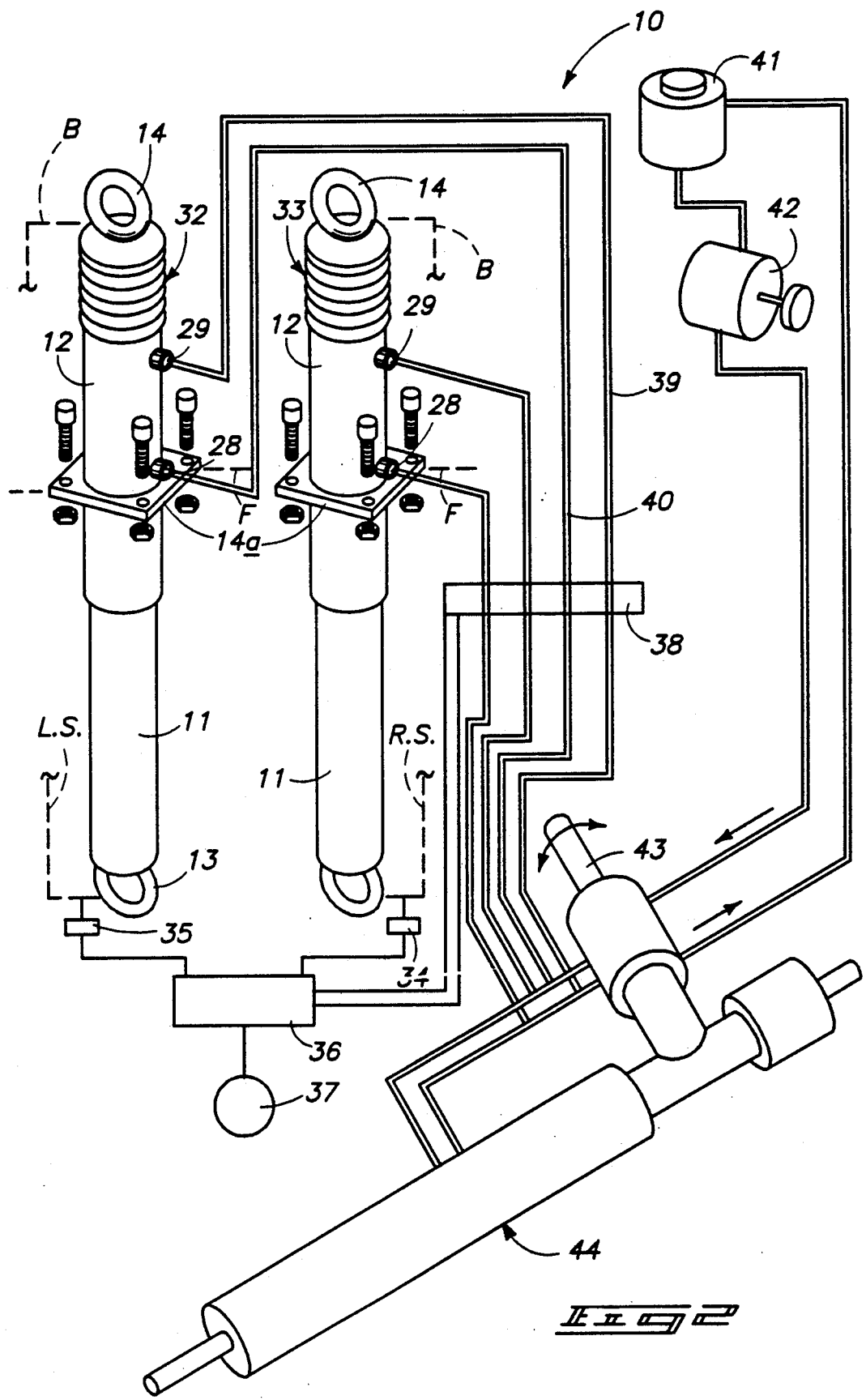
FIG. 2 is an isometric diagrammatic illustration of the instant invention.
Figure 3:
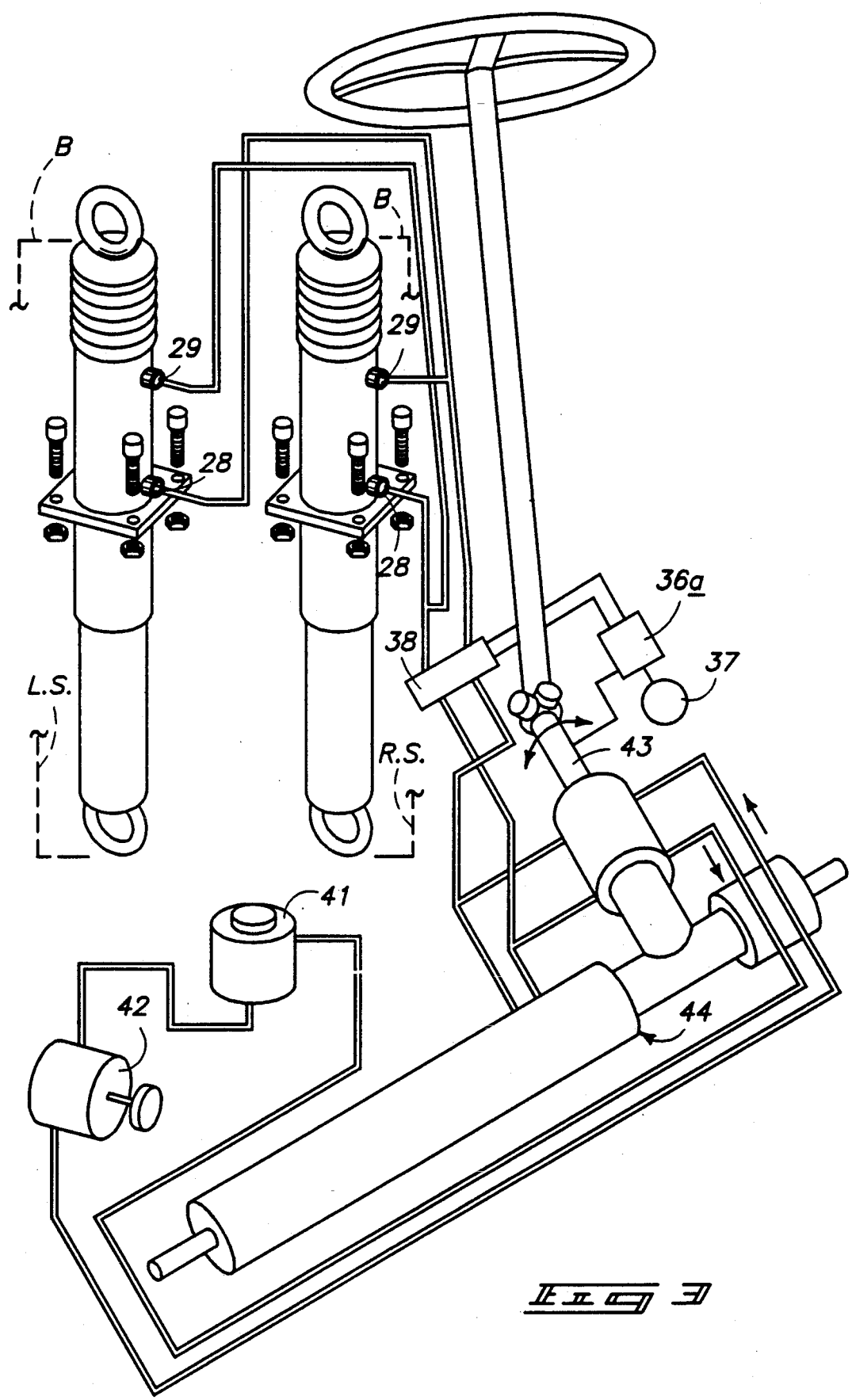
FIG. 3 is an isometric illustration of a modification of the invention utilizing a sensor relative to an associated vehicular steering column.

With reference now to the drawings, and in particular to FIGS. 1 to 3 thereof, a new and improved vehicular stabilizing shock absorber apparatus embodying the principles and concepts of the present invention and generally designated by the reference numeral 10 will be described.

More specifically, the vehicular stabilizing shock absorber apparatus 10 of the instant invention essentially comprises a control unit, as illustrated in FIG. 1, that includes a lower cylinder 11 reciprocatably received within an upper cylinder 12. A lower cylindrical mount 13 is fixedly mounted to a lower terminal end of the lower cylinder, with an upper mount 14 fixedly mounted to an upper terminal end of a second piston rod 24, to be discussed in more detail below, that is mounted to a body portion of an associated vehicle spaced from a frame portion "F" of the associated vehicle that is secured to the control unit by a medial mount 14a that is positioned medially to the upper cylinder 12 medially of a lower terminal end of the upper cylinder. A lower cylinder floor 15 is fixedly and sealingly mounted within a lower terminal end of the lower cylinder 11 to contain fluid within the lower cylinder, to be discussed in more detail below, wherein an upper cylinder plate and seal 16 is fixedly mounted to an upper terminal end of the upper cylinder to slidably receive a second piston 24 reciprocatably and coaxially directed through the upper cylinder plate and seal 16. An upper cylinder bottom plate 17 is sealingly mounted within the upper cylinder in a fixed relationship thereto coaxially aligned therewith and substantially coextensive with a top surface of the medial mount 14a. A first piston 18 is slidably mounted to a first piston rod 22. The first piston 18 is arranged for sliding relationship upwardly relative and along the first piston rod 22, but is not permitted to extend in the sliding relationship below the first piston rod 22 utilizing various abutments or stops in association with a lower terminal end of the first piston rod 22. The first piston rod 22 is coaxially aligned with the lower and upper cylinders 11 and 12 respectively and is fixedly mounted to a bottom surface of the upper cylinder bottom plate 17. A first fluid chamber 19 is accordingly defined between the first piston 18 and the lower cylinder floor 15 to contain a compressible dampening fluid 19a therewithin. A first compression spring 20 is mounted between the first piston 18 and a second piston 21 that is slidably mounted to the first piston rod 22 between the upper cylinder bottom plate 17 and the first piston 18. The first compression spring 20 is defined by a first stiffness relative to a first spring rate, wherein a second compression spring 23 is captured between the second piston 21 and the upper cylinder bottom plate 17 defined by a second stiffness relative to a second spring rate, wherein the second stiffness is greater than the first stiffness to provide enhanced resistance to telescoping of the lower cylinder 11 within the upper cylinder 12 during an end travel of the lower cylinder within the upper cylinder. The second piston rod 24 sealingly and slidably directed through the upper cylinder plate and seal 16 includes a third piston 26 fixedly mounted to a lower terminal end of the second piston rod 24. A second fluid chamber 25 is defined between the third piston 26 and the upper cylinder bottom plate 17, with a third fluid chamber 27 defined between the third piston 26 and the upper cylinder plate end seal 16. A first fluid inlet 28 is directed into the second fluid chamber 25, with a second fluid inlet 29 directed into the third fluid chamber 27.

FIG. 2 illustrates the organization 10 to include a plurality of control units defined by respective first and second control units 32 and 33. A right relay sensor 34 is utilized in cooperation to sense positioning of a right suspension component, with a left suspension component arranged relative to a left relay sensor 35, wherein the sensors are directed into a suspension sensor 36 that is also cooperative with a vehicular speedometer 37 to sense speed of the vehicle to effect operation of the control units. A primary sensor and comparator 38 includes hydraulic fluid lines directed through the rack and pinion steering box 44 of the associated vehicle that in turn cooperates with the steering column 43. A hydraulic reservoir 41 with a hydraulic pump 42 is arranged to effect pressurizing of the hydraulic lines of the organization. Specifically, a first hydraulic line 39 and a second hydraulic line 40 are in fluid communication with the hydraulic pump 42 through the rack and pinion steering box 44, wherein the first hydraulic line 39 is directed into a third fluid chamber of the first control unit 32 and to the second fluid chamber 25 of the second control unit 33. Similarly, the second hydraulic line 40 in fluid communication with the hydraulic pump 42 directs fluid into the third fluid chamber of the second control unit 33 and the second fluid chamber of the first control unit 32. In this manner, when a right side control unit is in an extended orientation, a left side control unit is in a contracted orientation and the reverse is true to accommodate various curves and banking in relation to surface driving conditions. The primary conditions and comparator 38 senses pressurizing within the respective second and third fluid chambers 25 and 27 of each control unit to direct hydraulic fluid into the second fluid chamber 25 of a control unit undergoing compression as the body "B" tilts and effects pressurizing of the second fluid chamber, wherein the other respective control unit has hydraulic fluid directed into its respective third fluid chamber 27 to effect contraction of that control unit to effect stabilizing of the body "B" in a neutral orientation relative to the framework "F". A reference velocity directed from the vehicular speedometer 37 is directed from the suspension sensor 36 into the primary sensor and comparator 38 to prevent application of hydraulic fluid into the control units below a certain velocity.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicular stabilizing shock absorber apparatus, comprising, a plurality of control units, wherein each of said control units are mounted to a vehicle, wherein the vehicle includes a right and left suspension component, a frame member, and a vehicular body positioned above the frame member, and a right control unit mounted between the right suspension component and the vehicular body, and a left control unit, wherein the left control unit is mounted between the left suspension component and the vehicular body, and each control unit includes a lower cylinder and an upper cylinder, the lower cylinder telescopingly received within the upper cylinder, and the lower cylinder including a lower mount for securement to said suspension component, and the upper cylinder including a medial mount secured to the frame, and the lower cylinder including a lower cylinder floor, and the lower cylinder including a first piston rod, and the medial mount fixedly secured medially of the upper cylinder, and the medial mount including an upper cylinder bottom plate positioned within the upper cylinder in alignment with a top surface of the medial mount, and the first piston rod fixedly and coaxially mounted relative to the upper cylinder and the lower cylinder secured to a bottom surface of the upper cylinder bottom plate and extending into the lower cylinder, with a first piston slidably mounted on the first piston rod in a spaced relationship relative to the lower cylinder floor, and a compressible dampening fluid contained within the lower cylinder between the first piston and the lower cylinder floor, and the first piston rod including a second piston slidably mounted on the first piston rod between the upper cylinder bottom plate and the first piston, and a first coil spring defined by a first stiffness captured between the first piston and the second piston, and a second coil spring defined by a second stiffness greater than the first stiffness captured between the second piston rod and the upper cylinder bottom plate.

2. An apparatus as set forth in claim 1 wherein the upper cylinder includes an upper cylinder top plate and seal, and the upper cylinder top plate and seal including a second piston rod reciprocatably and slidably directed therethrough, and a third piston fixedly mounted to a lower terminal end of the second piston rod to define a second fluid chamber between the third piston and the upper cylinder bottom plate, and a third fluid chamber between the third piston and the upper cylinder top plate and seal, and the second piston rod projecting above the upper cylinder including an upper mount for securement to the vehicular body.

3. An apparatus as set forth in claim 2 including a first fluid inlet directed into the second fluid chamber, and a second fluid inlet directed into the second fluid chamber, and first hydraulic line in fluid communication with a hydraulic reservoir and a hydraulic pump, wherein the first hydraulic line is directed into the third fluid chamber through the first fluid inlet of the left control unit and into the second fluid chamber of the right control unit through the first fluid inlet, and a second hydraulic line in fluid communication with the hydraulic pump and the hydraulic reservoir directed into the third fluid chamber of the right control unit and into the second fluid chamber of the left control unit.

4. An apparatus as set forth in claim 3 including a primary sensor and comparator with means for controlling directing of fluid into each fluid chamber for directing fluid into the third fluid chamber of the left control unit and into the second fluid chamber of the right control unit in a first position, and to direct fluid into the third fluid chamber of the right control unit and to the second fluid chamber of the left control unit in a second position.

5. An apparatus as set forth in claim 4 including a sensor operatively associated with the vehicular speedometer to prevent fluid directed through the primary sensor and comparator means when vehicular velocity is below a predetermined speed.

* * * * *